US012560126B2

(12) United States Patent (10) Patent No.: US 12,560,126 B2
Yazici et al. (45) Date of Patent: Feb. 24, 2026

(54) FAN EXIT GUIDE VANE THERMAL MANAGEMENT SYSTEM FOR CONVENTIONAL GAS TURBINE ENGINES

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/744,179

(22) Filed: Jun. 14, 2024

(65) Prior Publication Data

US 2025/0382921 A1 Dec. 18, 2025

(51) Int. Cl.
*F02C 9/18* (2006.01)
*F01D 5/18* (2006.01)
(Continued)

(52) U.S. Cl.
CPC .................. *F02C 9/18* (2013.01); *F01D 5/18* (2013.01); *F01D 9/02* (2013.01); *F01D 5/185* (2013.01); *F01D 5/187* (2013.01); *F01D 9/065* (2013.01); *F01D 25/002* (2013.01); *F01D 25/12* (2013.01); *F01D 25/305* (2013.01); *F01D 25/32* (2013.01);
(Continued)

(58) Field of Classification Search
CPC ...... F02C 9/16; F02C 9/18; F02C 7/14; F02C 7/185; F02C 6/08; F01D 9/065; F01D 5/187; F01D 5/185; F01D 25/12; F01D 25/305; F01D 25/32; F01D 25/002; F05D 2260/213; F05D 2260/20; F05D 2260/607; F05D 2260/232; F04D 29/582; F04D 29/5826; F04D 29/5833; F04D 29/584; F04D 29/5846; F04D 29/701; F02K 3/115
See application file for complete search history.

(56) References Cited

U.S. PATENT DOCUMENTS 5,782,077 A * 7/1998 Porte ....................... F02C 7/185
60/39.83
8,333,552 B2 12/2012 Wood et al.
(Continued)

FOREIGN PATENT DOCUMENTS

GB 1244340 A 8/1971

OTHER PUBLICATIONS

European Search Report dated Nov. 20, 2025, in connection with European Patent Application No. EP 25182809.1, 9 pages.

*Primary Examiner* — Nathaniel E Wiehe
*Assistant Examiner* — Art Golik

(57) ABSTRACT

A system includes a fan exit guide vane located aft of a rotor fan. The fan exit guide vane defines a first channel for a fluid from a thermal management system and a second channel therein for receiving bleed air from a low-pressure compressor. An inlet connects to a first end of the first channel to receive the fluid. An outlet connected to a second end of the first channel provides a cooled fluid. In a first mode, the fluid passing through the first channel is cooled by air from the rotor fan passing over exit guide vane and is further cooled by the bleed air passing through the second channel. In a second mode, the hot fluid passing through the first channel is cooled only by air from the rotor fan passing over the exit guide vane to provide the cooled fluid and bleed air is not provided.

18 Claims, 5 Drawing Sheets

(51) Int. Cl.

| | |
|---|---|
| F01D 9/02 | (2006.01) |
| *F01D 9/06* | (2006.01) |
| *F01D 25/00* | (2006.01) |
| *F01D 25/12* | (2006.01) |
| *F01D 25/30* | (2006.01) |
| *F01D 25/32* | (2006.01) |
| *F02C 6/08* | (2006.01) |
| *F02C 7/14* | (2006.01) |
| *F02C 7/18* | (2006.01) |
| *F02C 9/16* | (2006.01) |
| *F02K 3/115* | (2006.01) |
| *F04D 29/58* | (2006.01) |
| *F04D 29/70* | (2006.01) |

(52) U.S. Cl.
CPC ................. *F02C 6/08* (2013.01); *F02C 7/14* (2013.01); *F02C 7/185* (2013.01); *F02C 9/16* (2013.01); *F02K 3/115* (2013.01); *F04D 29/582* (2013.01); *F04D 29/5826* (2013.01); *F04D 29/5833* (2013.01); *F04D 29/584* (2013.01); *F04D 29/5846* (2013.01); *F04D 29/701* (2013.01); *F05D 2260/20* (2013.01); *F05D 2260/213* (2013.01); *F05D 2260/232* (2013.01); *F05D 2260/607* (2013.01)

(56) References Cited

U.S. PATENT DOCUMENTS

| | | | |
|---|---|---|---|
| 9,909,448 B2 | 3/2018 | Gerstler et al. | |
| 9,945,247 B2* | 4/2018 | Appukuttan | F02K 3/115 |
| 10,196,932 B2 | 2/2019 | Sennoun | |
| 11,015,468 B2 | 5/2021 | Zaccardi et al. | |
| 11,143,045 B2 | 10/2021 | Zaccardi et al. | |
| 11,156,114 B2 | 10/2021 | Chalaud et al. | |
| 11,686,249 B2* | 6/2023 | Pikovsky | F02C 7/185 60/782 |
| 11,815,024 B2* | 11/2023 | Niergarth | F28F 23/00 |
| 2005/0081530 A1* | 4/2005 | Bagnall | F04D 29/526 60/785 |
| 2015/0247462 A1 | 9/2015 | Suciu | |
| 2015/0345331 A1* | 12/2015 | Murray | F01D 25/24 60/785 |
| 2017/0204879 A1* | 7/2017 | Zaccardi | F02K 3/06 |
| 2019/0218971 A1* | 7/2019 | Niergarth | F02C 9/18 |
| 2020/0056549 A1* | 2/2020 | Terwilliger | F02C 9/28 |
| 2021/0115854 A1 | 4/2021 | Pikovsky et al. | |

* cited by examiner

FAN EXIT GUIDE VANE THERMAL MANAGEMENT SYSTEM FOR CONVENTIONAL GAS TURBINE ENGINES

TECHNICAL FIELD

This disclosure relates generally to thermal management systems for gas turbine engines. More specifically, this disclosure relates to using fan exit guide vanes as part of the thermal management system of a gas turbine engine.

BACKGROUND

The integration of gas turbine air-cool heat exchangers on commercial engines requires increased ducting for an external working fluid and exhaust of said fluid from either the fan airstream or an external airstream. In classical integrations, heat exchangers intake fan air into a block heat exchanger and exhaust the air into the fan airstream or core area to exhaust for thrust recovery. Such arrangements are implemented in a geared turbo fan architecture where the air-oil coolers are integrated into the nacelle inner flow surface and/or the nacelle upper bifurcation. Additionally, surface air coolers may be used, however such coolers are significantly heavier and incur significantly higher nacelle drag losses in comparison to block (plate-fin) air oil coolers. The integration of air-cool heat exchangers in a conventional turbo fan engine application is challenging from the perspective of physical installation due to the limited space existing within the engine cores or fan area for multiple air-cool heat exchangers. A manner for implementing a heat exchanger within existing gas turbine engine structure would be greatly beneficial.

SUMMARY

This disclosure relates to using fan exit guide vans as a heat exchanger within a gas turbine engine.

One aspect thereof comprises a system for cooling hot fluids from a thermal management system of a gas turbine engine. The system also includes at least one fan exit guide vane located aft of a rotor fan of the gas turbine engine, where the at least one fan exit guide vane defines at least one channel therein for a hot fluid from the thermal management system of the gas turbine engine. At least one inlet connects to a first end of the at least one channel for receiving the hot fluid from the thermal management system of the gas turbine engine. At least one outlet connects to a second end of the at least one channel for providing a cooled fluid to the thermal management system of the gas turbine engine, and where the hot fluid passing through the at least one channel within the at least one fan exit guide vane is cooled by air from the rotor fan passing over the at least one fan exit guide vane to provide the cooled fluid.

Implementations may include one or more of the following features. The system where the at least one inlet and the at least one outlet are located at a top of the at least one fan exit guide vane. The at least one inlet and the at least one outlet are located at a bottom of the at least one fan exit guide vane. The at least one fan exit guide vane further defines at least one second channel therein for receiving bleed air 213 from a low-pressure compressor of the gas turbine engine, further where the bleed air 213 passing through the at least one second channel within the at least one fan exit guide vane cools the hot fluid passing through the at least one channel of the at least one fan exit guide vane to provide the cooled fluid. The system may include at least one second inlet connected to a first end of the at least one second channel for receiving the bleed air 213 from the compressor, and at least one second outlet associated with the at least one second channel for outputting the bleed air 213 in the at least one second channel. The at least one fan exit guide vane further defines a plurality of channels connected to a trailing edge of the at least one fan exit guide vane; and where the at least one second outlet may include a plurality of outlets, each of the plurality of outlets associated with one of the plurality of channels connected to the trailing edge of the at least one fan exit guide vane. The system may include a dirt rejection apparatus for removing dirt from the bleed air 213 within the at least one second channel. The bleed air 213 from the compressor is only provided to the at least one second channel during a ground idle mode of operation of the gas turbine engine.

In another aspect thereof the system for cooling hot fluids from a thermal management system of a gas turbine engine. The system also includes at least one fan exit guide vane located aft of a rotor fan of the gas turbine engine, where the at least one fan exit guide vane defines at least one first channel therein for a hot fluid from the thermal management system of the gas turbine engine and at least one second channel therein for receiving bleed air 213 from a compressor of the gas turbine engine. At least one inlet connects to a first end of the at least one first channel for receiving the hot fluid from the thermal management system of the gas turbine engine. At least one outlet connects to a second end of the at least one first channel for providing a cooled fluid to the thermal management system of the gas turbine engine. In a first mode of operation the hot fluid passing through the at least one first channel within the at least one fan exit guide vane is cooled by air from the rotor fan passing over the at least one fan exit guide vane and is further cooled by bleed air 213 passing through the at least one second channel defined by the at least one fan exit guide vane to provide the cooled fluid. In a second mode of operation the hot fluid passing through the at least one first channel within the at least one fan exit guide vane is cooled only by air from the rotor fan passing over the at least one fan exit guide vane to provide the cooled fluid and the bleed air 213 is not provided to the at least one second channel.

Implementations may include one or more of the following features. The system where the at least one inlet and the at least one outlet are located at a top of the at least one fan exit guide vane. The at least one inlet and the at least one outlet are located at a bottom of the at least one fan exit guide vane. The at least one fan exit guide vane further defines a plurality of channels connected to a trailing edge of the at least one fan exit guide vane and where the at least one second channel further may include a plurality of outlets, each of the plurality of outlets associated with one of the plurality of channels connected to the trailing edge of the at least one fan exit guide vane. The system may include a dirt rejection apparatus for removing dirt from the bleed air 213 within the at least one second channel. The first mode of operation may include a ground idle mode of operation of the gas turbine engine and the second mode of operation may include at least one of a maximum takeoff mode or cruising mode of operation of the gas turbine engine.

In a further aspect thereof a method for cooling hot fluids from a thermal management system of a gas turbine engine. The method also includes receiving a hot fluid from the thermal management system of the gas turbine engine through at least one inlet connected to a first end of at least one first channel defined within at least one fan exit guide vane of the gas turbine engine, passing the hot fluid from the thermal management system of the gas turbine engine through the at least one first channel defined within the at least one fan exit guide vane located aft of a rotor fan of the gas turbine engine, receiving bleed air 213 from a low-pressure compressor of the gas turbine engine through at least one second channel defined within the at least one fan exit guide vane, cooling the hot fluid passing through the at least one first channel within the at least one fan exit guide vane by air from the rotor fan passing over the at least one fan exit guide vane in a first mode of operation to provide a cooled fluid, cooling the hot fluid passing through the at least one first channel by the bleed air 213 passing through the at least one second channel defined by the at least one fan exit guide vane in the first mode of operation to provide the cooled fluid, cooling the hot fluid passing through the at least one first channel within the at least one fan exit guide vane only by air from the rotor fan passing over the at least one fan exit guide vane to provide the cooled fluid where the bleed air 213 is not provided to the at least one second channel in a second mode of operation, and providing the cooled fluid to the thermal management system of the gas turbine engine via at least one outlet connected to a second end of the at least one first channel.

Implementations may include one or more of the following features. The method where the at least one inlet and the at least one outlet are located at a top of the at least one fan exit guide vane. The at least one inlet and the at least one outlet are located at a bottom of the at least one fan exit guide vane. The step of receiving further may include outputting heated bleed air 213 from the at least one fan exit guide vane via a plurality of channels connected to a trailing edge of the at least one fan exit guide vane. The method further may include removing dirt from the bleed air 213 within the at least one second channel using a dirt rejection apparatus. The first mode of operation may include a ground idle mode of operation of the gas turbine engine and the second mode of operation may include at least one of a maximum takeoff mode or cruising mode of operation of the gas turbine engine.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
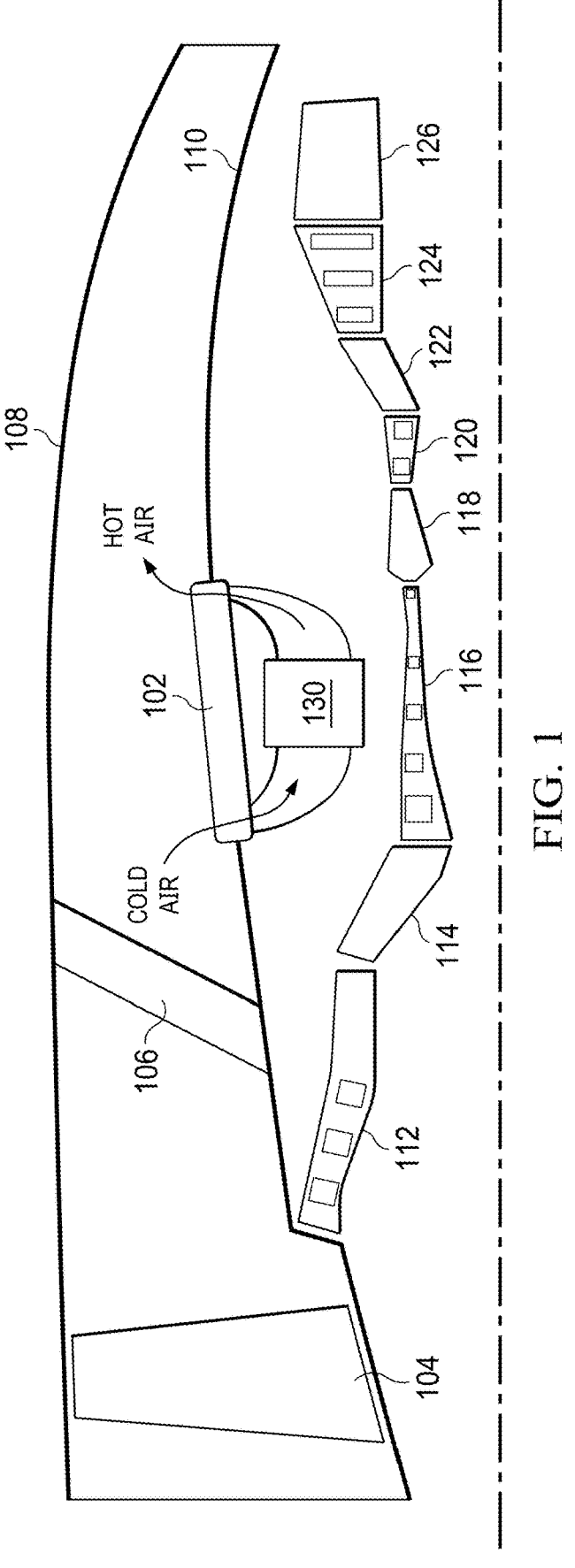
FIG. 1 illustrates an existing system using a heat exchanger as part of the thermal management system.

FIG. 1 illustrates an existing system that utilizes a block heat exchanger as part of the thermal management system for a gas turbine engine. Within an existing thermal management system, an air scoop 102 is located aft of the rotor fan 104 and the fan exit guide vanes 106. Cold air that is sucked into the engine nacelle 108 passes through the rotor fan 104 and the fan exit guide vanes 106 between the outer surface of the nacelle 108 and a nacelle inner flow surface 110 as well as passing to the combustion portion of the gas turbine engine. The combustion portion of the gas turbine engine consists of the low-pressure compressor 112, compressor frame 114, high-pressure compressor 116, combustion chamber 118, high-pressure turbine 120, turbine frame 122, low-pressure turbine 124 and exhaust frame 126. The cold air that proceeds by the fan exit guide vane 106 may be captured by a scoop 102 that scoops up the cold air for use within a block heat exchanger 130. The scooped cold air passes over heat transfer elements within the heat exchanger 130 to cool liquids or gases flowing through the heat exchanger 130. The heat absorbed by the cool air passing over the heat exchanger 130 is exhausted out of the scoop 102 back into the area between the exterior surface of the nacelle 108 and the nacelle inner flow surface 110. As discussed previously, the block heat exchanger 130 requires the use of a significant amount of space within the gas turbine engine and solutions for removing or limiting the size of the block heat exchanger 130 would be greatly beneficial. Additionally, the ability to remove the scoop 102 in addition to the heat exchanger 130 would limit drag within the gas turbine engine further improving engine performance.

Figure 2:
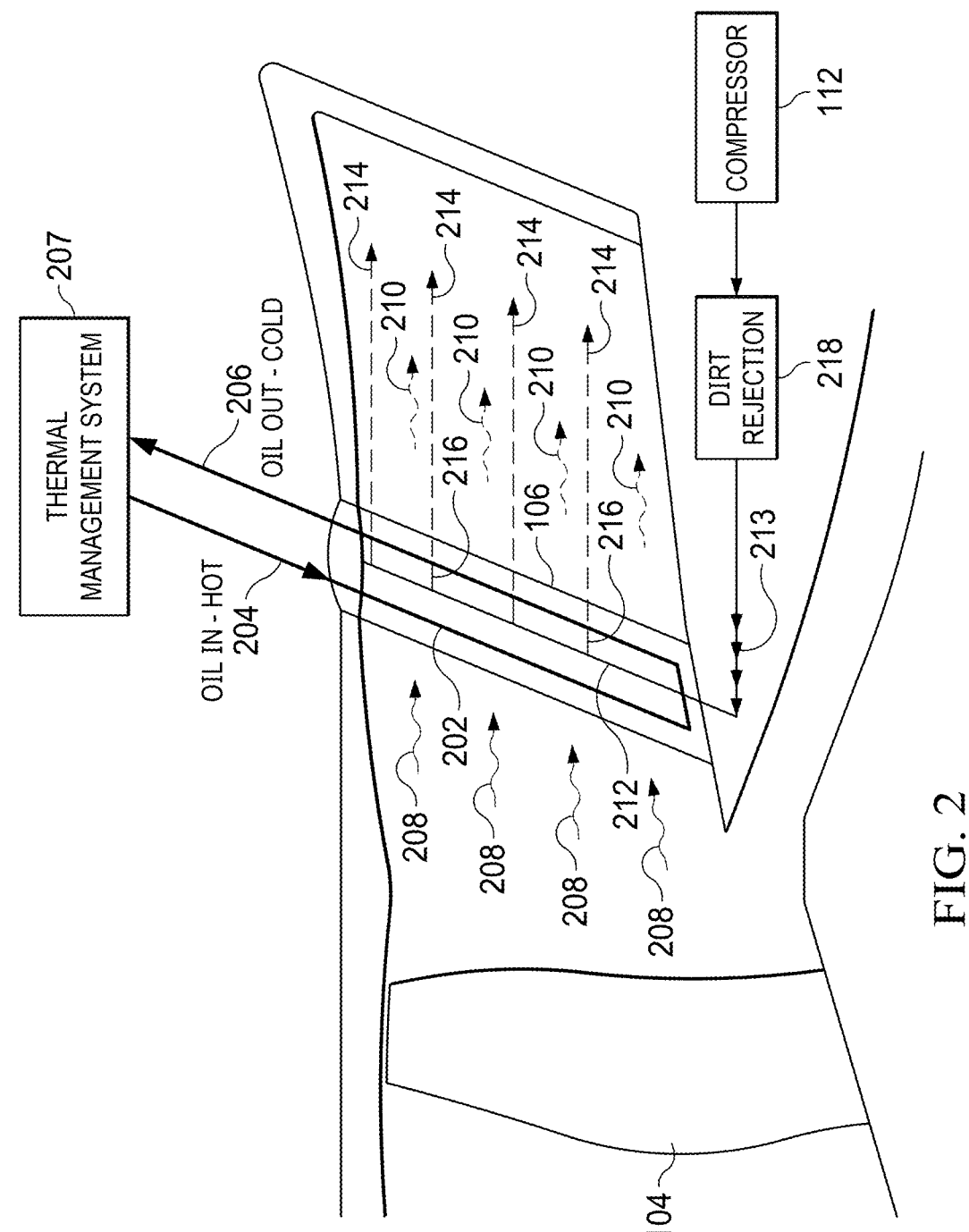
FIG. 2 illustrates a first mode of operation of a fan mounted thermal management system using a fan exit guide vane.

Referring now to FIG. 2, there is illustrated a first mode of operation using the fan exit guide vane 106 as a heat exchanger within a fan mounted thermal management system. In the embodiment of FIG. 2, the fan exit guide vane 106 has a first channel 202 defined therein that enters the fan exit guide vane 106 at a top inlet port 204 passes the length of the body of the fan exit guide vane 106 two times through a substantially U-shaped channel (other channel shapes may be used) and exits the fan exit guide vane through an output port 206. The first channel 202 receives oil that is hot from the gas turbine engine thermal management system 207, and the oil is cooled as it passes through the channel 202 within the fan exit guide vane 106 by the ambient pressured fan air 208 provided from the rotor fan 104 at the intake of the gas turbine engine. The fan air 208 cools the hot oil within the channel 202 such that cooled oil is provided from the outlet port 206 of the channel 202 in the fan exit guide vane 106. The cooled oil output from the channel 202 has a lower temperature that the hot oil originally provided to the channel. The air 210 that passes by the vane 106 is hotter, heat exchanged air due to the fact of the air flowing over the fan exit guide vane 202 has removed the heat from the oil within the channel 202.

In addition to the first channel 202 including oil from the fan mounted thermal management system 207, the fan exit guide vane 106 may define a second channel 212 for providing compressor bleed air 213 through the fan exit guide vane for providing a further cooling effect to the oil within the first channel 202. The low-pressure compressor bleed air 213 is provided to channel 212 from the low pressure compressor 112 of the gas turbine engine. The compressor bleed air 213 provides a further cooling effect to the oil located within the first channel 202. The hotter compressor bleed heat exchanged air 214 is dumped into the fan airstream via trailing edge passages 216 defined within the fan exit guide vane 106. Alternatively, rather than using the trailing edge passages 216 the heated compressor bleed air 213 may be exited from the fan exit guide vane 106 via some type of outlet port. In order to prevent clogging of the channel 212 and the trailing edge passages 216, some type of dirt rejection mechanism 218 may be implemented in the feedline for the compressor bleed air 213 between the low-pressure compressor 112 and the fan exit guide vane 106 channel 212 to prevent dirt from entering the channel 212.

The configuration of FIG. 2 may operate in multiple modes. The provision of compressor bleed air 213 would only be provided to the channel 212 in a ground idle mode of operation for the gas turbine engine when the bleed air 213 would be sufficiently cool to provide additional cooling properties to the oil flowing through channel 202. When not in the ground idle mode of operation the bleed air 213 would not be provided and only the thermal cooling properties provided by the ambient pressured fan air 208 flowing over the fan exit guide vane 106 would be used for cooling the oil in channel 202. This will be more fully described herein below with respect to FIGS. 3 and 4. The purpose of providing the compressor bleed air 213 during the ground idle condition is that the heat exchange capabilities provided from the fan air 208 flowing over the fan exit guide vanes 106 would be less in the ground idle condition and increased cooling capabilities are provided by the provision of the bleed air 213 from the compressor 112.

Figure 3:
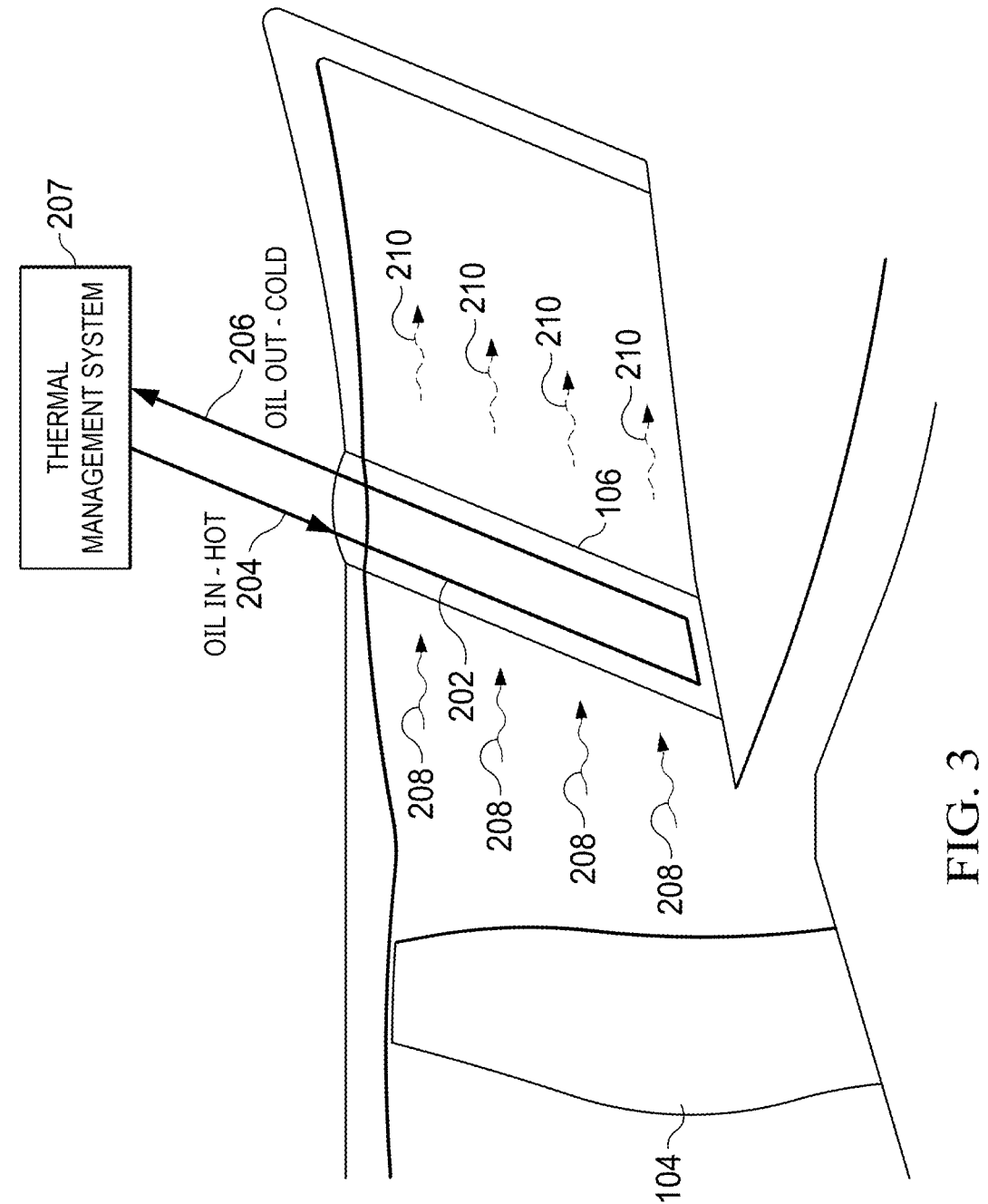
FIG. 3 illustrates a second mode of operation of a fan mounted thermal management system using a fan exit guide vane.

Referring now to FIG. 3, there is more particularly illustrated a second mode of operation wherein the heat exchange capabilities are provided only by the channel 202 flowing through the fan exit guide vanes 106. This illustrates the mode of operation when the gas turbine engine is operating at maximum takeoff (MTO) power or cruising power. In this mode of operation, all heat exchange capabilities with respect to the fan exit guide vanes 106 are provided by the ambient pressured fan air 208 flowing over the fan exit guide vane 106. The air 208 flowing over the guide vane 106 removes the heat from the oil within the channel 202 and the hotter heat exchange fan air 210 exits from the area of the fan exit guide vanes 106. The hot oil is provided to the channel 202 from the thermal management system 207 through inlet 204 and the cooled oil is provided back to the thermal management system from the outlet 206 of the channel 202.

Figure 4:
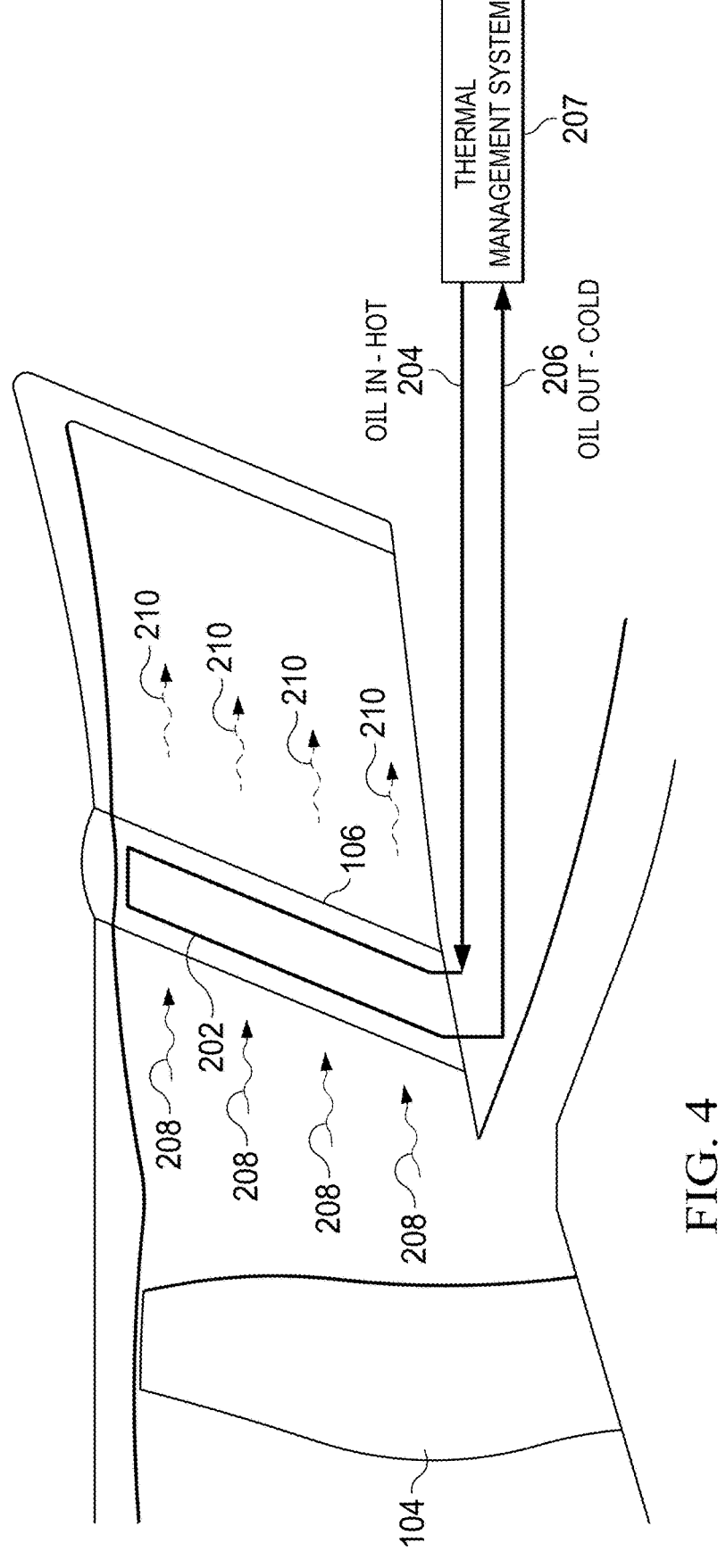
FIG. 4 illustrates a second embodiment of a second mode of operation of a core mounted thermal management system using a fan exit guide vane.

Referring now to FIG. 4, there is illustrated the second mode of operation for a second embodiment wherein the thermal management system 207 is core-mounted rather than fan mounted. As before, the heat exchange capabilities are provided only by the channel 202 flowing through the fan exit guide vanes 106. The fan exit guide vane 106 has a first channel 202 defined therein that enters the fan exit guide vane 106 at a bottom inlet port 204 and substantially traverses the length of the body of the fan exit guide vane 106 two times through a substantially U-shaped channel (other different shape channels may be used) and exits the fan exit guide vane through a bottom output port 206. Similar to FIG. 3, this illustrates the mode of operation when the gas turbine engine is operating at maximum takeoff (MTO) power or cruising power. In this mode of operation all heat exchange capabilities with respect to the fan exit guide vanes 106 are provided by the ambient low-speed and low-pressure fan air 208 flowing over the fan exit guide vane 106. The air 208 flowing over the guide vane 106 removes the heat from the oil within that the channel 202 and the hotter heat exchange fan air 210 exits from the area of the fan exit guide vanes 106. The hot oil is provided to the channel 202 from the thermal management system 207 through inlet 204 and the cooled oil is provided back to the thermal management system from the outlet 206 of the channel 202.

Figure 5:
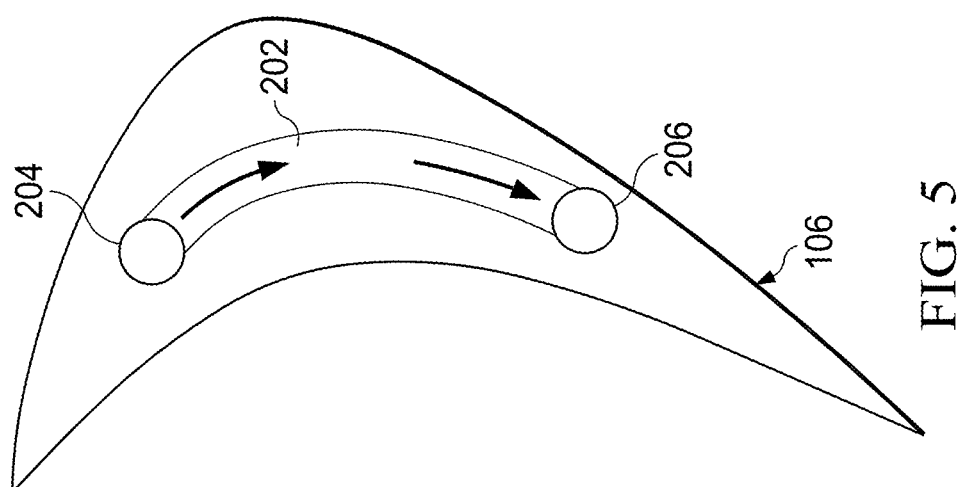
FIG. 5 illustrates a first embodiment of a cross section of the airfoil comprising the fan exit guide vane.

Referring now to FIG. 5 there is illustrated a cross-sectional view of a first embodiment of the channel 202 passing through fan exit guide vane 106. In this embodiment, only the channel 202 is included that receives hot oil from the thermal management system 207 to pass through the vane 106. This would occur during the MTO or cruise conditions discussed with respect to FIGS. 3 and 4. The hot oil supply is provided at inlet 204 and the cooled oil exits at outlet 206. The hot oil entering at inlet 204 is cooled as it passes the length of the channel 202 and exits as cooled oil at outlet 206. It will be appreciated that the shape and dimensions of the channel 202 and the fan exit guide vane 106 are merely by way of example and other shapes and configurations of the channel 202 and vane 106 may be utilized. This embodiment could also only include a single mode of operation since that provides only the single channel 202 passing through the vane 106 for providing heat exchange capabilities.

Figure 6:
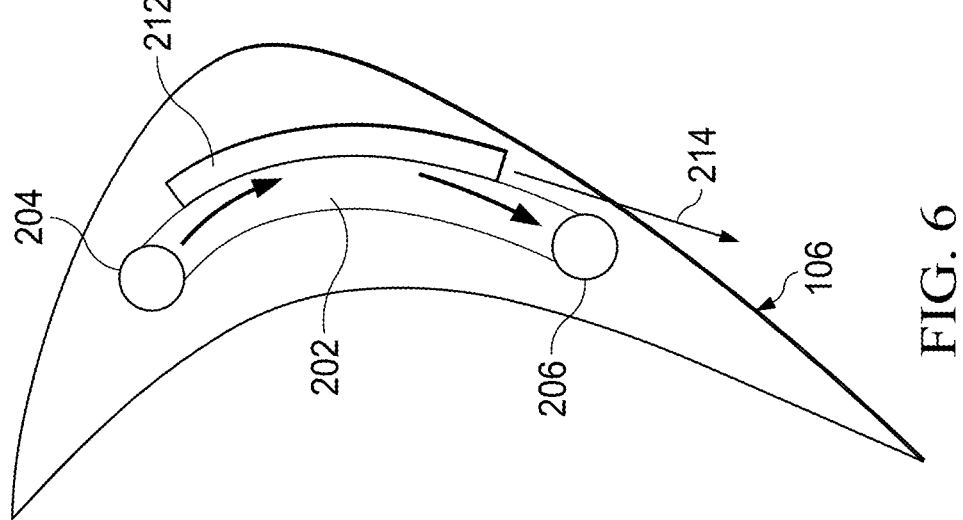
FIG. 6 illustrates a first embodiment of a cross section of the airfoil comprising the fan exit guide vane with bleed air 213 cooling passage.

Referring now to FIG. 6 there is illustrated a cross-sectional view of a second embodiment of the channel 202 passing through fan exit guide vane 106 having two modes of operation. In this embodiment, the channel 202 is included and hot oil from the thermal management system 207 passes through the vane 106 to cool the hot oil passing through the fan exit guide vane 106. The fan exit guide vane 106 additionally includes channel 212 enabling cooling air to pass through the vane 106 and provide additional cooling to the liquids within the channel 202. The heat provided to the cool air within channel 212 is dispersed as trailing edge discharge via the compressor bleed heat exchange air 214 as discussed previously with respect to FIG. 2. This vane 106 would have dual modes of operation. In a first mode, channel 202 enables the vane 106 to act as a liquid cooled heat exchanger. This would occur during the MTO or cruise power modes discussed with respect to FIGS. 3 and 4. The hot oil supply is provided at inlet 204 and the cooled oil exits at outlet 206. The hot oil entering at inlet 204 is cooled as it passes the length of the channel 202 and provides a cooled oil at outlet 206 due to the flow of air 208 past the vane 106. During a second mode of operation, bleed air from the compressor 213 is provided to channel 212 to provide additional cooling affects to the liquid within channel 202. This would occur in the ground idle mode of operation of the aircraft as discussed more particularly in FIG. 2. It will be appreciated that the shape and dimensions of the channels 202 and 212 and the fan exit guide vane 106 are merely by way of example and other shapes and configurations of the channel 202 and vane 106 may be utilized.

The above-described use of the fan exit guide vane 106 including internal channels to have the vane act as a heat exchanger provides a number of advantages to existing gas turbine engine designs. By having the high-pressure flow for the heat exchanger during engine idle, the thermal management system 207 is optimize enabling a decrease in the size of the heat exchanger or its complete elimination. The elimination of heat exchangers in the core area provides packaging advantages for the rest of the engine hardware. The elimination of the scoop 102 described with respect to FIG. 1, brings drag related fuel burn (FB) benefit. The elimination of the scoop 102 increases the producibility for the engine nacelle 108. The elimination of the heat exchanger provides weight benefit due to the elimination of the heat exchanger, inlet, outlet, IFS scoop and metal enforcement of IFS and associated part numbers and cost. The injection of hotter air into the fan airstream from the fan exit guide vanes 106 also provides a certain amount of thrust benefit.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for cooling a hot fluid from a thermal management system of a gas turbine engine, comprising:
    at least one fan exit guide vane located aft of a rotor fan of the gas turbine engine, wherein the at least one fan exit guide vane defines at least one first channel therein for the hot fluid from the thermal management system of the gas turbine engine and at least one second channel therein for receiving bleed air from a low-pressure compressor of the gas turbine engine;

at least one inlet connected to a first end of the at least one first channel for receiving the hot fluid from the thermal management system of the gas turbine engine;
    at least one outlet connected to a second end of the at least one first channel for providing a cooled fluid to the thermal management system of the gas turbine engine;
    wherein in a ground idle mode of operation the hot fluid passing through the at least one first channel within the at least one fan exit guide vane is cooled by air from the rotor fan passing over the at least one fan exit guide vane and is further cooled by the bleed air passing through the at least one second channel defined by the at least one fan exit guide vane to provide the cooled fluid; and
    wherein in a maximum takeoff mode of operation the hot fluid passing through the at least one first channel within the at least one fan exit guide vane is cooled only by the air from the rotor fan passing over the at least one fan exit guide vane to provide the cooled fluid and the bleed air is not provided to the at least one second channel.

2. The system of claim 1, wherein the at least one inlet and the at least one outlet are located at a top of the at least one fan exit guide vane.

3. The system of claim 1, wherein the at least one inlet and the at least one outlet are located at a bottom of the at least one fan exit guide vane.

4. The system of claim 1 further comprising:
    wherein the at least one fan exit guide vane further defines a plurality of trailing edge channels connected to a trailing edge of the at least one fan exit guide vane; and
    wherein the at least one second channel further comprises a plurality of outlets, each of the plurality of outlets associated with one of the plurality of trailing edge channels connected to the trailing edge of the at least one fan exit guide vane.

5. The system of claim 1 further comprising a dirt rejection apparatus for removing dirt from the bleed air within the at least one second channel.

6. The system of claim 1 wherein the hot fluid passing through the at least one first channel within the at least one fan exit guide vane is cooled only by the air from the rotor fan passing over the at least one fan exit guide vane to provide the cooled fluid and the bleed air is not provided to the at least one second channel in a cruising mode of operation of the gas turbine engine.

7. A method for cooling a hot fluid from a thermal management system of a gas turbine engine, comprising:
    receiving the hot fluid from the thermal management system of the gas turbine engine through at least one inlet connected to a first end of at least one first channel defined within at least one fan exit guide vane of the gas turbine engine;
    passing the hot fluid from the thermal management system of the gas turbine engine through the at least one first channel defined within the at least one fan exit guide vane located aft of a rotor fan of the gas turbine engine;
    receiving bleed air from a low-pressure compressor of the gas turbine engine through at least one second channel defined within the at least one fan exit guide vane;
    cooling the hot fluid passing through the at least one first channel within the at least one fan exit guide vane by air from the rotor fan passing over the at least one fan exit guide vane in a ground idle mode of operation to provide a cooled fluid;

cooling the hot fluid passing through the at least one first channel by the bleed air passing through the at least one second channel defined by the at least one fan exit guide vane in the first ground idle mode of operation to provide the cooled fluid;

cooling the hot fluid passing through the at least one first channel within the at least one fan exit guide vane only by the air from the rotor fan passing over the at least one fan exit guide vane to provide the cooled fluid wherein the bleed air is not provided to the at least one second channel in a maximum takeoff mode of operation; and providing the cooled fluid to the thermal management system of the gas turbine engine via at least one outlet connected to a second end of the at least one first channel.

8. The method of claim 7, wherein the at least one inlet and the at least one outlet are located at a top of the at least one fan exit guide vane.

9. The method of claim 7, wherein the at least one inlet and the at least one outlet are located at a bottom of the at least one fan exit guide vane.

10. The method of claim 7 wherein the step of receiving the bleed air further comprises outputting heated bleed air from the at least one fan exit guide vane via a plurality of trailing edge channels connected to a trailing edge of the at least one fan exit guide vane.

11. The method of claim 7 further comprises removing dirt from the bleed air within the at least one second channel using a dirt rejection apparatus.

12. The method of claim 7, further comprising cooling the hot fluid passing through the at least one first channel within the at least one fan exit guide vane only by the air from the rotor fan passing over the at least one fan exit guide vane to provide the cooled fluid wherein the bleed air is not provided to the at least one second channel in a cruising mode of operation of the gas turbine engine.

13. A system for cooling a hot fluid from a thermal management system of a gas turbine engine, comprising:

at least one fan exit guide vane located aft of a rotor fan of the gas turbine engine, wherein the at least one fan exit guide vane defines at least one first channel therein for the hot fluid from the thermal management system of the gas turbine engine and at least one second channel therein for receiving bleed air from a low-pressure compressor of the gas turbine engine;

at least one inlet connected to a first end of the at least one first channel for receiving the hot fluid from the thermal management system of the gas turbine engine;

at least one outlet connected to a second end of the at least one first channel for providing a cooled fluid to the thermal management system of the gas turbine engine;

wherein in a ground idle mode of operation of the gas turbine engine the hot fluid passing through the at least one first channel within the at least one fan exit guide vane is cooled by air from the rotor fan passing over the at least one fan exit guide vane and is further cooled by the bleed air passing through the at least one second channel defined by the at least one fan exit guide vane to provide the cooled fluid; and wherein in at least one of a maximum takeoff mode or cruising mode of operation of the gas turbine engine the hot fluid passing through the at least one first channel within the at least one fan exit guide vane is cooled only by the air from the rotor fan passing over the at least one fan exit guide vane to provide the cooled fluid and the bleed air is not provided to the at least one second channel.

14. The system of claim 13, wherein the at least one inlet and the at least one outlet are located at a top of the at least one fan exit guide vane.

15. The system of claim 13, wherein the at least one inlet and the at least one outlet are located at a bottom of the at least one fan exit guide vane.

16. The system of claim 13 further comprising:

wherein the at least one fan exit guide vane further defines a plurality of trailing edge channels connected to a trailing edge of the at least one fan exit guide vane; and wherein the at least one second channel further comprises a plurality of outlets, each of the plurality of outlets associated with one of the plurality of trailing edge channels connected to the trailing edge of the at least one fan exit guide vane.

17. The system of claim 13 further comprising a dirt rejection apparatus for removing dirt from the bleed air within the at least one second channel.

18. The system of claim 13 further comprising:

at least one second inlet connected to a first end of the at least one second channel for receiving the bleed air from the compressor; and at least one second outlet associated with the at least one second channel for outputting the bleed air from the at least one second channel.

* * * * *